Apr. 17, 1923. 1,451,796
L. E. WATERMAN ET AL
TRACTOR
Filed June 9, 1919 6 Sheets-Sheet 6
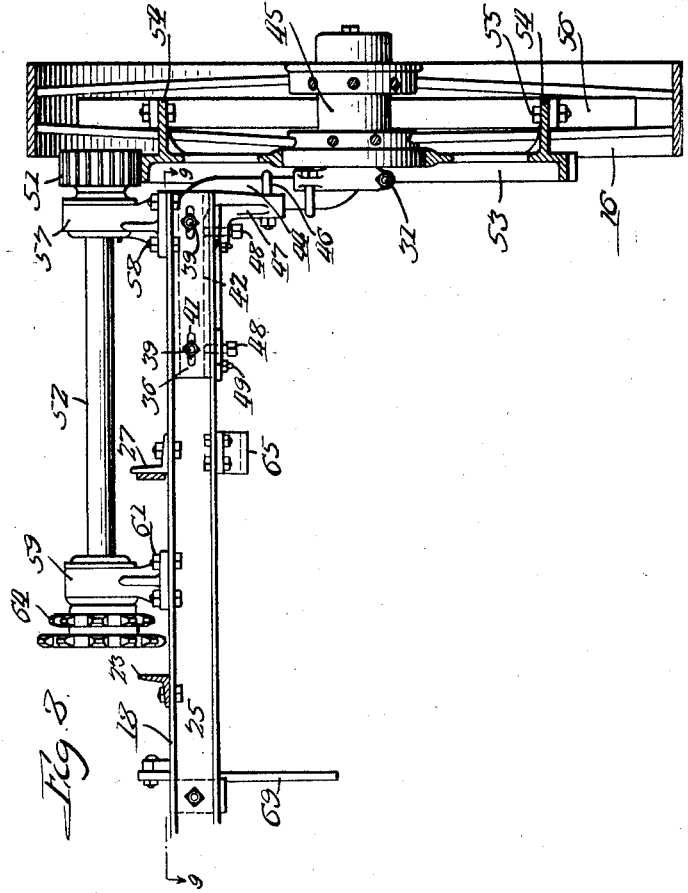
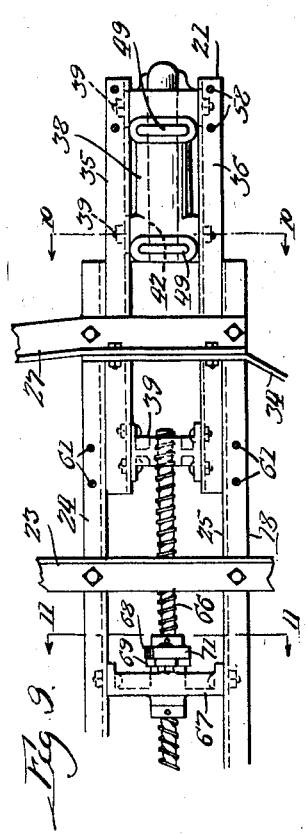
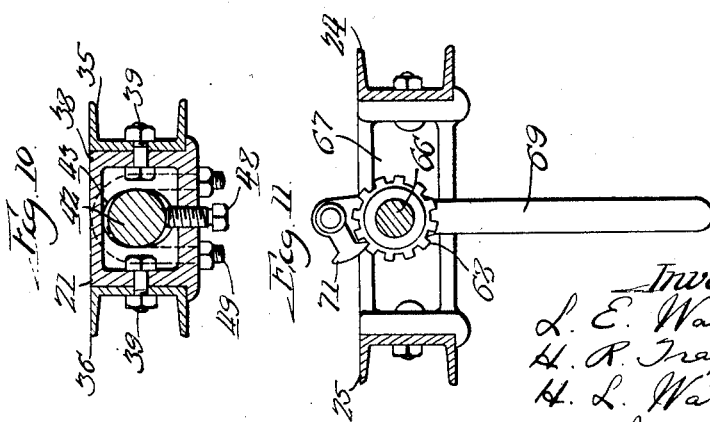
Inventors:
L. E. Waterman
H. R. Traphagen
H. L. Waterman
By Ira J. Wilson
Atty.

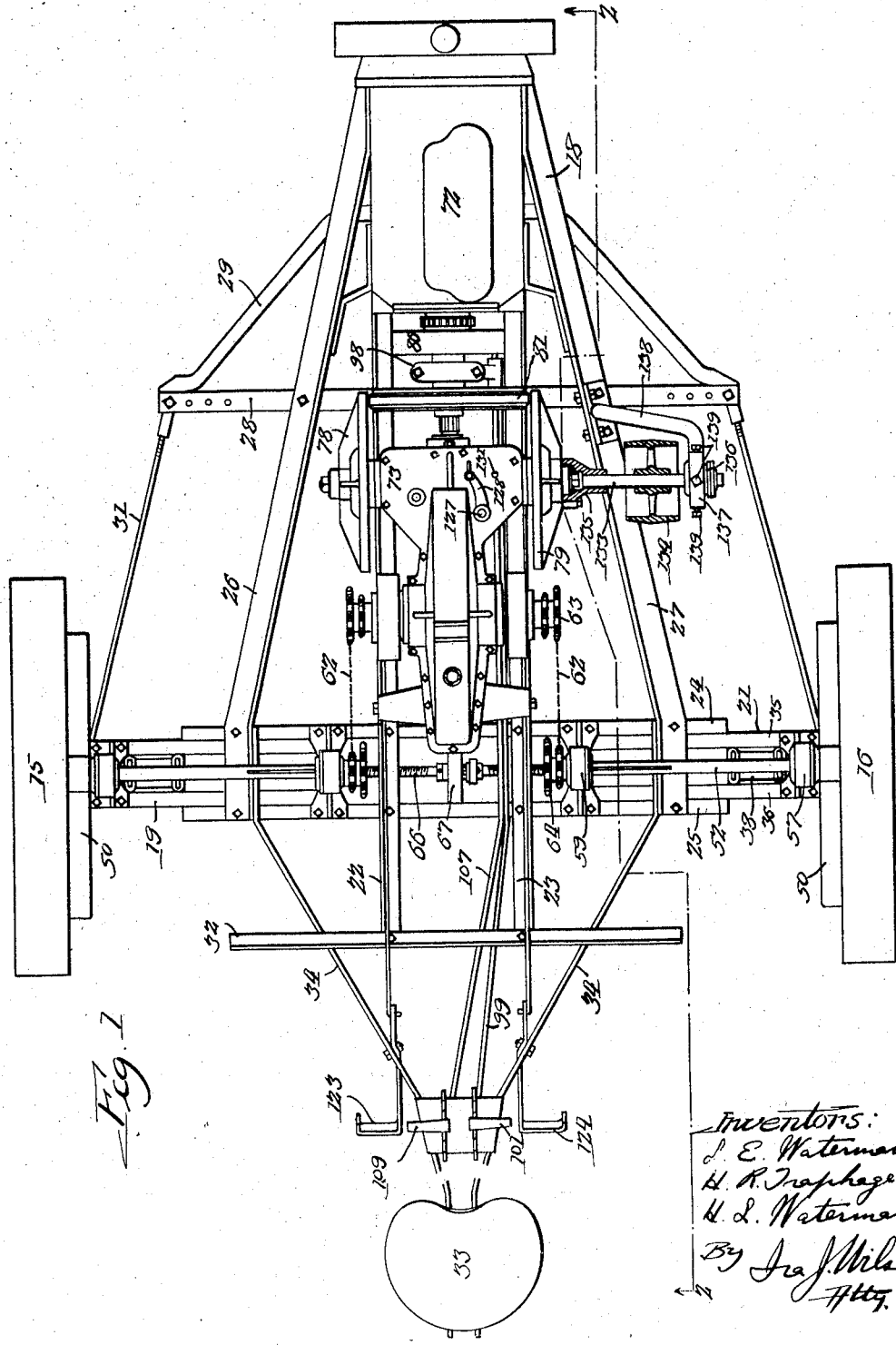

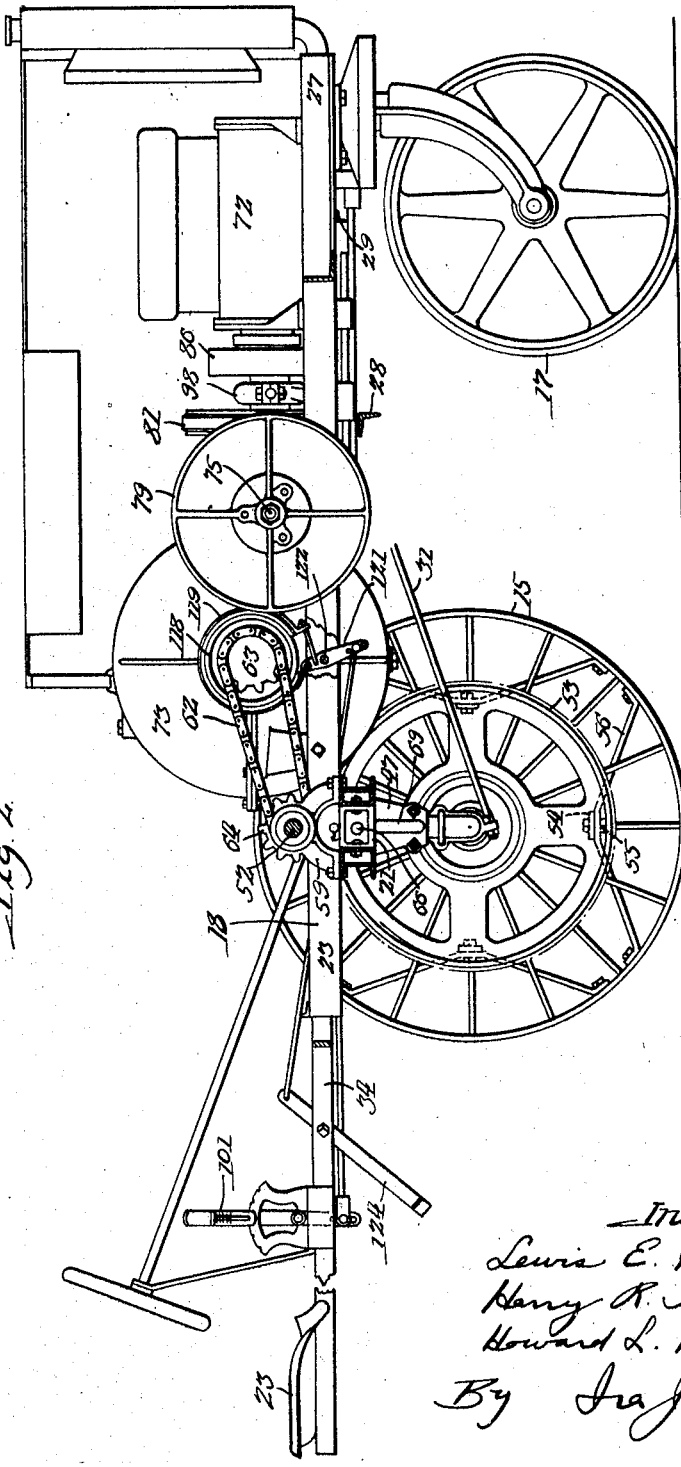

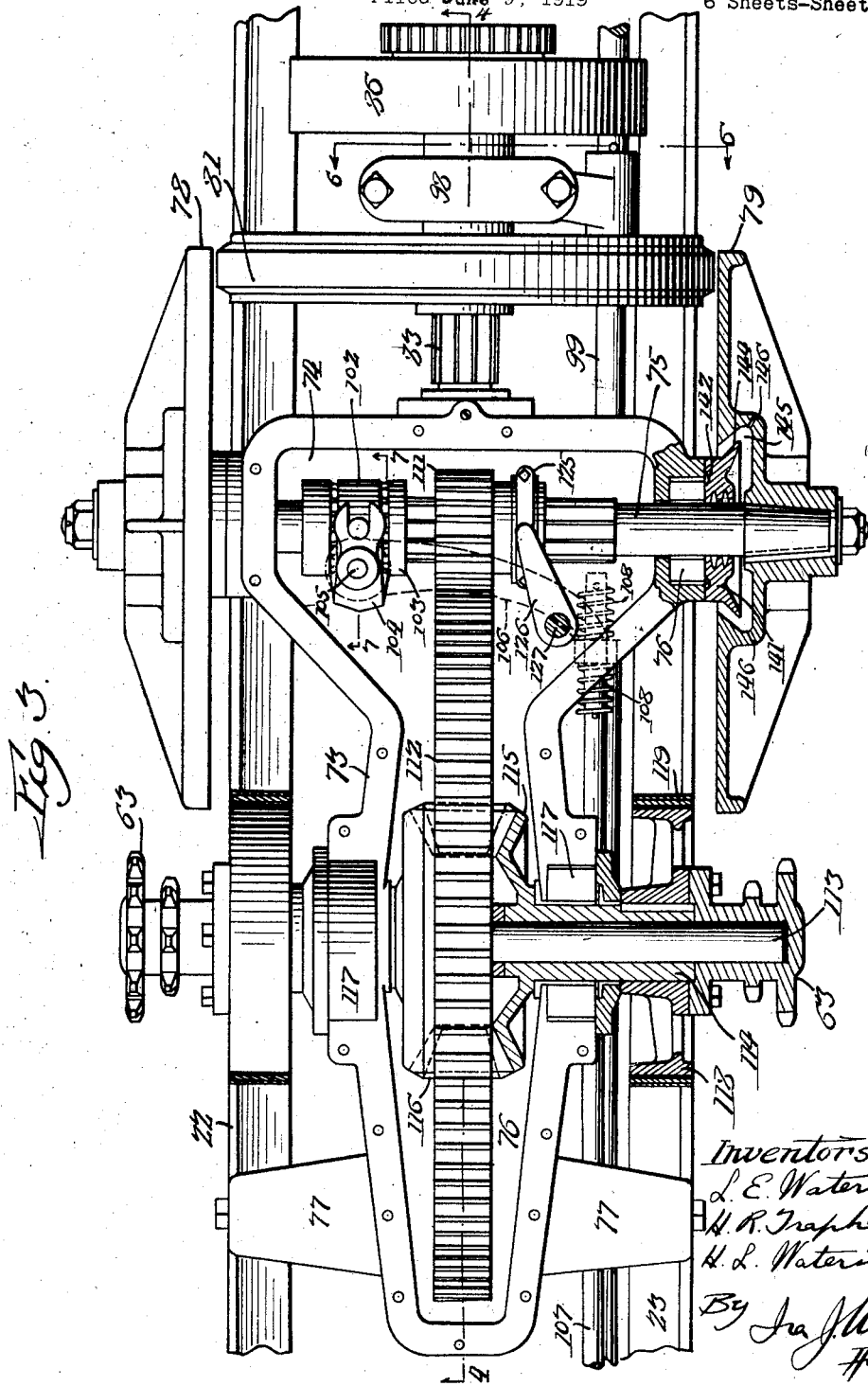

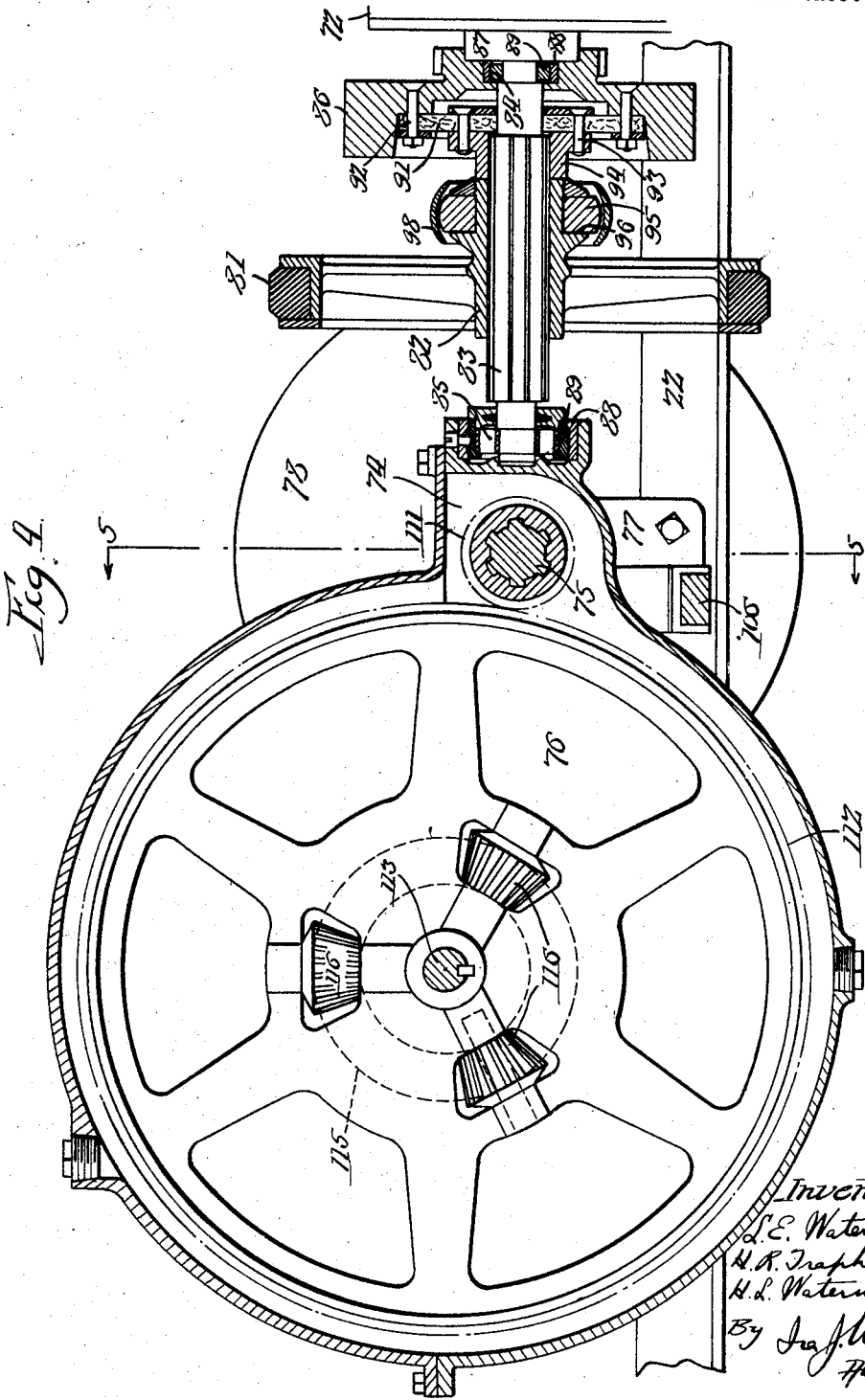

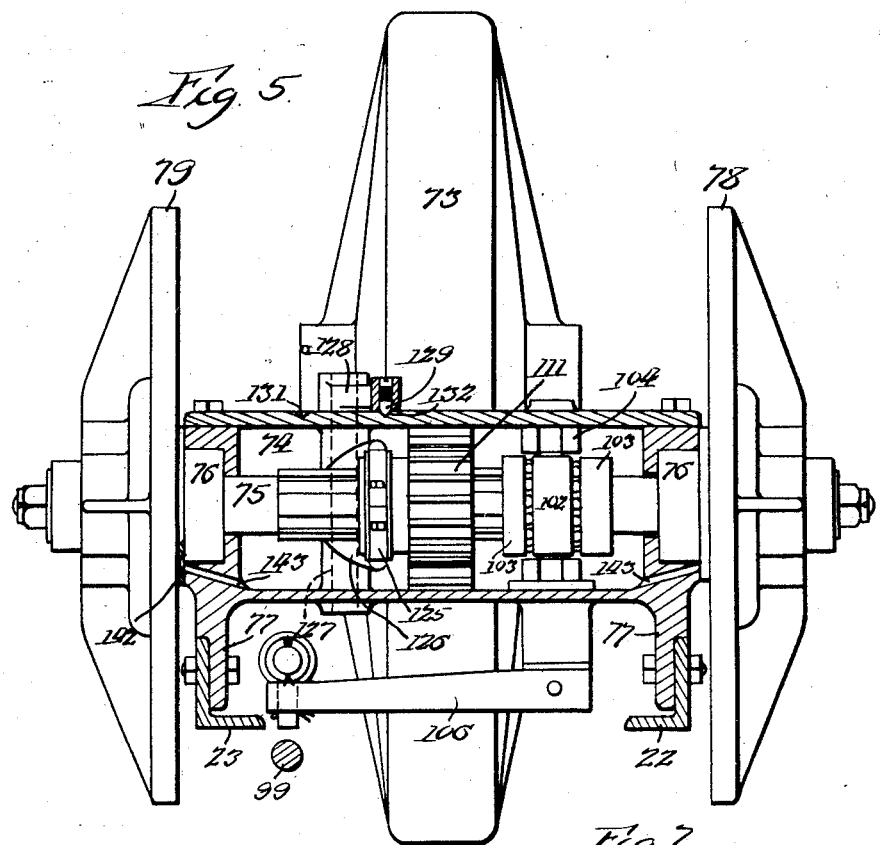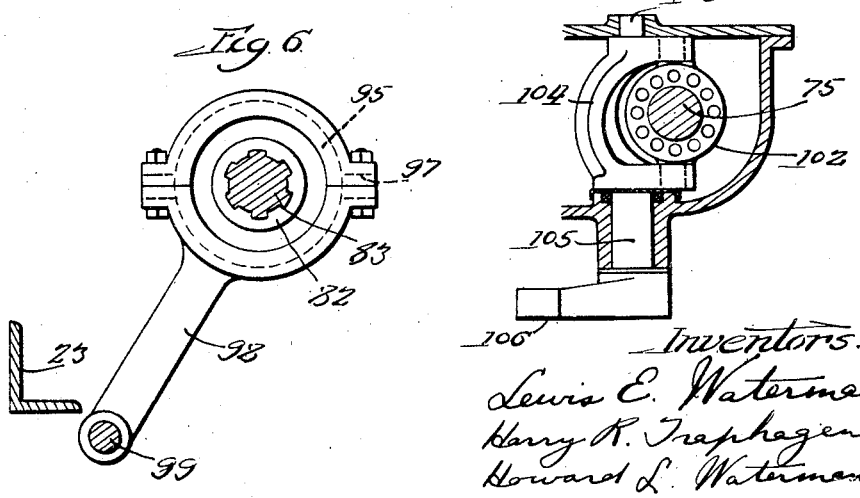

Patented Apr. 17, 1923.

1,451,796

UNITED STATES PATENT OFFICE.

LEWIS E. WATERMAN, HARRY R. TRAPHAGEN, AND HOWARD L. WATERMAN, OF ROCKFORD, ILLINOIS, ASSIGNORS TO EMERSON-BRANTINGHAM COMPANY, OF ROCKFORD, ILLINOIS, A CORPORATION OF ILLINOIS.

TRACTOR.

Application filed June 9, 1919. Serial No. 302,695.

*To all whom it may concern:*

Be it known that we, LEWIS E. WATERMAN, HARRY R. TRAPHAGEN, and HOWARD L. WATERMAN, citizens of the United States, residing at Rockford, in the county of Winnebago and State of Illinois, have invented certain new and useful Improvements in Tractors, of which the following is a specification.

Our invention pertains generally to motor vehicles and to that class known as farm tractors.

It is particularly desirable in the design of farm tractors that they shall be readily adaptable to the numerous needs of power application on a farm and to the working conditions and requirements which vary in different localities. With this in mind, we have aimed to provide a farm tractor of generally improved design and construction whereby the engine power may be utilized in a most efficient manner for the various needs of the average farm. In other words, our chief object is to provide a farm tractor, the frame and transmission mechanism of which are so designed and co-ordinated as to effectually serve not only the ordinary purposes of a tractor, viz: power pulley drive, hauling and the pulling of plows, drags, drills and numerous other farm implements, but which shall also be well adapted for cultivating purposes and for operating in fields in which the plants are in rows of different widths.

Our object also is to provide a farm tractor of the above character, the power transmission of which is readily adaptable to the various working conditions and requirements to which a tractor of this type is subjected, and the control and operation of which is simple and thoroughly practical.

A further object resides in the provision of a farm tractor possessing the desired qualities, which shall be so designed as to be capable of economical production on a commercial basis.

A still further object is to so design and arrange the mechanism which transmits power between the engine and the traction wheels and to so co-ordinate this with the peculiar frame structure as to secure the greatest efficiency in tractive and draw-bar power and also to avoid undue strain and friction on working parts and the consequent loss of power and damage to such parts.

These and other objects and attendant advantages will be better appreciated by those familiar with this art as the invention becomes better understood by reference to the following description when considered in connection with the accompanying drawings in which we have illustrated a preferred embodiment of our improvements.

Referring to the drawings,—

Fig. 1 is a plan view of a farm tractor embodying our improvements showing a portion of the power pulley mounting in section;

Fig. 2, a longitudinal sectional view through the tractor taken substantially on the line 2—2 of Fig. 1;

Fig. 3, an enlarged plan view of the transmission mechanism with the cover of the transmission casing removed;

Fig. 4, a longitudinal sectional view through the transmission mechanism taken substantially on the line 4—4 of Fig. 3;

Fig. 5, a transverse sectional view through the transmission taken substantially on the line 5—5 of Fig. 4;

Figs. 6 and 7, detail sectional views taken substantially on the lines 6—6 and 7—7, respectively, of Fig. 3;

Fig. 8, a fragmentary rear elevation of one of the traction wheels and its mounting on the frame;

Fig. 9, a plan view of the traction wheel mounting shown in Fig. 8, with the traction wheel and its immediate driving means removed; and Figs. 10 and 11, detail sectional views taken substantially on the lines 10—10 and 11—11, respectively, of Fig. 9.

Referring to Fig. 1, it will be seen that our improved farm tractor in its preferred embodiment is of the three-wheel type consisting of two rear traction wheels 15 and 16 and a forward intermediate dirigible and caster wheel 17. These wheels carry the main frame designated generally by character 18, the dirigible wheel having a permanent connection therewith and the traction wheels being adjustably attached thereto through the agency of laterally adjustable frame sections designated generally by characters 19 and 21, which as explained more fully hereinafter, are adjustable inwardly and outwardly on the main frame to change the tread for different requirements when cultivating. The main frame consists preferably of a pair of longitudinal power plant sills 22 and 23 at present in the form of angle iron beams interposed between and upon which are mounted as individual units, a motor and a transmission casing. To the rear portion of the sills is rigidly secured a pair of transverse channel beams or cross sills 24 and 25 with which the frame sections 19 and 21 are adjustably associated, and the outer portions of these channel beams are rigidly tied together and braced by the longitudinally extending outer frame sills 26 and 27 which are rigidly joined at their forward ends to the central frame sills. A forwardly located transverse beam 28 rigidly connected to the outer sills 26 and 27 and braced by the angle bar 29 serves for the attachment of radius rods 31 which connect with the traction wheel running gear for taking certain strains on the same as will be noted hereinafter. The transverse beam 28 also serves as what might be termed a draw bar as the cultivating devices (not shown) are adapted to be attached at their forward ends to this beam and suspended beneath the tractor frame, the cultivating devices being further supported at their rear ends from the transverse bar 32 secured to the rear end of the center frame sills. An operator's seat 33 is supported at the rear of the traction wheels through the agency of rearwardly converging frame-connected members 34, which also support the operating devices for controlling the motor, transmission and steering mechanisms.

The running gear and immediate driving means per se for the traction wheels constitute the subject matter of a companion application, Serial No. 302,697. In order that a clear understanding of the present improvements may be had, a description of this construction is given as follows. It will be noted that the main frame is supported relatively high to clear the plants when the tractor is used for cultivating purposes and also to accommodate the cultivating devices which are suspended beneath and carried by the frame. Since the running gear and immediate driving means for each traction wheel is the same, a description of one will suffice. The adjustable frame section 21 in its preferred embodiment consists of a pair of front and rear channel beams 35 and 36 respectively interposed between the channel beams 24 and 25 rigidly secured together in spaced relation at their outer and inner ends by an interposed axle bracket 38 and a screw shaft bracket 39. As shown in Figs. 8 and 10, the channel beams 35 and 36 are rigidly secured to the bracket 38 by means of bolts 39 which pass through elongated openings 41 in the web of the channel beams, thus permitting of horizontal adjustment of the bracket 38 relatively to the frame section 21. The bracket 38 is shaped to receive the horizontal portion 42 of an axle member and is preferably cored longitudinally for this purpose to provide a bore 43 slightly elongated in cross section, as shown in Fig. 10, for the purpose of permitting vertical adjustment or play of said axle portion within the bore. The axle member has an upright portion 44 joining the horizontal portion 42 with the axle proper upon which the hub 45 of the traction wheel revolves. The upright portion 44 of the axle member is clamped by means of a U-bolt 46 to a depending extension 47 integral with the bracket 38. Adjustable means are now provided for securing the horizontal portion 42 of the axle member to the bracket 38, consisting preferably of a pair of set screws 48 and U-bolts 49. The set screws are arranged as shown in Fig. 8 adjacent to the outer and inner ends of the bracket 38 and are threaded through the lower wall thereof as shown in Fig. 10 and form vertically adjustable seats for the axle portion 42. The U-bolts 49 arranged adjacent to the set screws 48 and embracing the top of the axle portion 42 and passing down through the bottom of the bracket 38, are equipped with the usual nuts for drawing the bolts tight to clamp the axle member in fixed position on the set screws. It will be obvious that by adjustment of these set screws and the U-bolts the position of the axle portion 42 with respect to the horizontal may be varied, thereby canting the traction wheel with respect to the vertical for the purpose of properly aligning the driving connection for the traction wheel as mentioned hereinafter.

The immediate means for driving the traction wheel is associated with the running gear and traction wheel in the following manner: Our invention contemplates the provision of a cross shaft or jack shaft so mounted in connection with the adjustable frame section 21 and having such driving connection with the traction wheel that the jack shaft, the frame section and traction wheel constitute a unit adapted to be adjusted laterally on the main frame. In the present illustration of our improvements, this driving connection is by direct engagement of a spur gear 51 on the jack shaft 52 with a bull gear 53 fixed to the traction wheel. The bull gear fits on the hub of the traction wheel and is provided with laterally extending lugs 54 which are secured by bolts 55 to the struts 56 in turn fixed to the rim of the traction wheel. The jack shaft 52 has a bearing at its outer end in the bearing bracket 57 which is secured by means of bolts 58 to the outer end of the adjustable frame section. The inner end of the jack shaft is journaled in a bearing bracket 59 secured by bolts 61 to the channel beams 24 and 25 of the main frame. The jack shaft is adapted to be driven by a suitable sprocket chain 62 trained over sprockets 63 and 64, the former of which is fixed to one of the driven members of the differential and the other splined on the jack shaft. Inasmuch as the jack shaft is held against longitudinal axial movement with respect to the bearing bracket 57 the relation between the gears 51 and 53 is not changed when the frame section 21 is adjusted laterally. It will be manifest that when such an adjustment is made, the sprocket 64 will first be loosened so as not to interfere with the bearing bracket 59 when adjusting the frame outwardly. The frame section 21 during movement inwardly and outwardly on the main frame is guided at its sides between the channel beams 24 and 25, at its top by the frame bar 27 and the base of the bearing bracket 59, and at its bottom by a guide plate 65 fixed to the channels 24 and 25. The cross shaft 52 by being mounted at its outer end in a bracket fixed to the adjustable frame section and at its inner end in a bearing bracket fixed to the main frame, also functions as a guide between the adjustable frame section and the main frame. As shown in Fig. 1, a casing 50 covers the gears 51 and 53.

Means is now provided for positively moving the traction wheel frame sections at each end of the main frame inwardly and outwardly in unison and for locking them in any adjusted position. This means consists preferably of a single screw shaft 66 passing through a bracket 67 fixed to the channel beams 24 and 25 and held against longitudinal axial movement with respect to the bracket 67 by suitable collars. This screw shaft is provided at one end with a left hand screw and at its opposite end with a right hand screw, and these are threadingly engaged respectively with the brackets 39 at the inner ends of the adjustable frame sections. By revolving the screw shaft 66, the frame sections 19 and 21 will be simultaneously moved inwardly and outwardly according to the direction in which said shaft is rotated. As shown in Fig. 11, the screw shaft 66 is equipped with a fixed ratchet wheel 68 and also a loose hand lever 69 which is provided with a pawl 71 co-operating with the ratchet wheel. By oscillating the lever 69, the screw shaft 66 will be rotated in one direction by means of the ratchet connection and by swinging the pawl to the opposite side from that shown in Fig. 11 the screw shaft will be revolved in the opposite direction. This ratchet and screw device provides a very effective and practical means for adjusting the frame sections in unison and also serves to lock these frame sections in any position to which they have been moved.

Coming now to the motor and to the transmission mechanism for connecting the same with the jack shafts 52, it will be understood that the transmission mechanism per se which we illustrate herein is the subject matter of another companion application Serial No. 302,696. This transmission mechanism, however, co-operates in a peculiar manner with the motor and the jack shafts to the end that a novel arrangement is produced which is especially advantageous to a farm tractor of the character in mind. It is desired both for economical and practical reasons to mount the motor and the transmission casing as separate units on the inner frame sills 22 and 23, and to transmit the engine power between these units through the agency of a friction drive. Our present improvements contemplate a novel connection between the motor and transmission casing, whereby the connecting parts and the driving elements are not affected by relative displacement of the motor and transmission casing, due to lateral and torsional straining or twisting of the main frame incidental to traveling over uneven ground, such as a farm tractor travels over very frequently. The novel results attained by incorporating this transmission mechanism in a tractor in the manner disclosed herein will be evident from the following description of the construction and operation thereof. The engine or motor designated generally by the character 72 and the transmission casing by the character 73 are rigidly and separately mounted upon and between the center sills 22 and 23, the motor being positioned at the extreme forward end of the frame and the transmission mechanism between the motor and jack shafts 52 as shown. The transmission casing shaped to provide a forward, narrow and laterally elongated compartment 74 inclosing a transverse friction disk shaft designated generally by the character 75, and a rear upright circular compartment 76 housing a differential mechanism, is rigidly supported at its forward and rear ends by legs 77 secured to the frame sills 22 and 23. The casing has a top and base suitably bolted together forming an oil-proof and dust-tight inclosure for the running parts which it is desired to keep well lubricated and free from dust and dirt.

The friction disk shaft 75 journaled in suitable bearings 76 projects at each end beyond the casing and has fixedly mounted upon its projecting ends, the friction disks 78 and 79. The friction disk shaft is free to slide longitudinally of its axis for shifting the friction disks in a lateral direction into and out of engagement with an interposed friction driving wheel 81 mounted for wardly of the friction disk shaft and driven from the engine in the following manner.

Referring more particularly to Fig. 4, it will be noted that the friction driving wheel is provided with a hub 82 splined upon a shaft 83 which is journaled at its forward and rear ends in the bearings 84 and 85 respectively. These bearings are constructed in a novel manner to permit of certain flexibility in order to relieve the parts from undue strain and wear caused by relative movement between the engine and transmission casing due to torsion or twisting of the frame. In the present instance, the bearing 84 is carried by the fly wheel element 86 which is fixed to the part 87 in turn driven by the engine crank shaft. The rear bearing 85 is supported by a forward extension of the transmission casing base. Both the forward extension and rear bearings include outer and inner parts 88 and 89 respectively, the meeting surfaces of which are on an arc struck from the center of the shaft in a plane parallel with the longitudinal axis thereof. This construction provides what may be termed a universal mounting for each end of the shaft 83 permitting disalignment of this shaft with respect to the engine crank shaft without imposing any strain on the associated parts. Inasmuch as the fly wheel 86 is rigidly connected with the driving part 87 it is necessary to provide a flexible driving connection between the fly wheel and the friction drive shaft 83 consisting of a diaphragm 91 of flexible material such as leather rigidly secured to its periphery by fastening means 92 to the fly wheel and at its center portion by the fastening means 93 to a central collar 94 splined on the shaft 83. The power then is transmitted from the parts 87 to the fly wheel 86, then through the flexible diaphragm 91, the central collar 94, and the shaft 83 to the friction driving wheel. It will be noted that the shaft 83 is supported at one end on a rigid casing which also carries the friction disks 78 and 79, so that these friction driving elements are supported in a very substantial operative relation, and at the same time the shaft 83 is so mounted as to allow for flexing of the frame and relative movement between the engine and transmission casing.

Suitable means may be provided for shifting the driving wheel 81 longitudinally on the shaft 83 to either drive the friction disk 78 or 79 and at different distances from the center thereof to produce faster or slower forward or reverse speeds as will be manifest, depending upon which friction disk is engaged and on the location of the driving wheel. This means in the present instance, consists of a collar 95 disposed in the annular groove 96 in the hub of the friction drive wheel and trunnioned at its ends 97 (Fig. 6) in a shifting arm 98 fixed to an operating rod 99 adapted to be shifted at will by the operator through any suitable control means for moving the friction drive wheel rearwardly and forwardly on the shaft 83. It will be noted that the arm 98 entirely embraces the collar 95 and is shaped to provide annular edges over-reaching the collar so as to prevent oil from being thrown onto the friction disks. In the present instance the operating rod 99 is extended rearwardly and attached through an adjustable connection to a manually operable lever 101 positioned on the frame 34 in front of the operator's seat and co-operating with a suitable notched segment.

In order to move the friction disk shaft longitudinally of its axis to engage and disengage either the disk 78 or 79 and the friction driving wheel and to hold the disks in set working positions the following means is provided. This comprises a collar 102 loosely embracing the shaft 75 and interposed between collars 103 fixed against longitudinal movement on the shaft. The stationary collar 102 is equipped with trunnions engaged by the ends of a yoke 104, which in turn is provided with top and lower pivot portions or trunnions 105 pivotally mounted on the top and base sections of the transmission casing as shown in Fig. 7. The bearing for the lower trunnion or pivot shaft 105 is packed to prevent leakage of oil from the casing. Any suitable anti-friction thrust bearing may be employed between the shifting collar 102 and the revolving collars 103. An arm 106 fixed to the lower end of the yoke shaft 105 is connected at its outer end with an operating rod 107 through the agency of compression springs 108 at both sides of the arm. The rod 107 connects at its rear end to a hand lever 109 in a manner similar to the lever connection of the rod 99. With this construction, when the lever 109 is moved forward, the shaft 75 will be shifted to engage the friction disk 78 with the driving wheel 81 in a yielding engagement as distinguished from a sharp quick contact which is detrimental to the fibre surface of the driving wheel and when moved in the reverse direction will engage the disk 79. The engaging of these friction disks by operation of the lever 109 produces forward and reverse driving speeds, as will be manifest, and by operating the lever 101 to shift the friction driving wheel the speed ratios may be changed.

The friction disk shaft 75 directly drives a differential mechanism by means of a spur pinion 111 splined on the shaft and meshing with the differential driving gear 112. This latter gear it will be noted is of relatively large diameter to secure the proper reduction and is entirely inclosed by the transmission casing so that all of the gears run in a dust-proof and oil-tight inclosure. The differential driving gear is keyed to a differential shaft 113 upon each end of which is freely revoluble a driven member in the form of a sleeve 114 carrying a bevel gear 115 in mesh with the intermediate bevel gears or pinions 116 carried by the differential driving gear. The sleeves 114 journaled in suitable bearings 117 on the transmission casing support the differential mechanism. Thus a differential mechanism of simple construction is directly driven from the friction disk shaft 75 at the proper speed reduction and a common casing supports and houses this mechanism, the friction disk shaft, and the means for shifting said shaft longitudinally. Upon the end of each sleeve 114 is rigidly secured a brake pulley 118 with which cooperates a split band 119 adapted to be contracted by operation of a lever 121 (Fig. 2) pivotally mounted at 122 upon the inner side of the frame sill 23. It will be noted that the ends of the brake band are connected to the lever 121 at a common side of the pivot 122 in such manner that upon swinging the lever in a clockwise direction viewing Fig. 2, the brake band will be contracted in a very effective manner. To each driven member of the differential is rigidly secured a driving member 63 mentioned above for driving the adjacent jack shaft, and in the present instance this driving member is in the form of a double sprocket gear, by means of which two general ranges of driving speeds may be transmitted to the traction wheels. The purpose of the differential mechanism is well known in the art; and the band brakes are used to retard rotation of either traction driving wheel at will, so that the power will be transmitted to the other at accelerated speed to turn the tractor about the retarded traction wheel as a pivot. The band brakes 108 are under the immediate control of the operator, and in order that the tractor shall be steered in the same manner as a pivot wheel cultivator we have connected the brake levers 121 with foot levers 123 and 124, the operation of which by forward foot pressure causes either brake to be instantly engaged for producing either slight steering movements or complete turns. Suitable springs may be used if necessary, to return and hold the levers in normal position. By arranging the brakes on the driven members of the differential, the strain when engaging either brake is limited to a minimum number of parts, as it will be noted that when either brake is engaged the strain is relieved on the driving parts between such brake and its respective traction wheel.

Referring now to Fig. 1, we have combined with our improved transmission mechanism, a power pulley attachment whereby the power from the friction disk shaft 75 may be utilized for other purposes than for propelling a tractor. We have aimed to detachably secure a power pulley in co-axial alignment with the friction disk shaft so that the pulley will be continuously driven thereby, and to provide means for unmeshing the pinion 111 and gear 112 to break the driving train to the traction wheel at the most advantageous point. To this end we have provided the pinion 111 with a grooved hub embraced by a collar 125 which is connected with a shifting yoke 126 having an operating shaft 127 extending through the top of the transmission casing and equipped with an arm or handle 128 by means of which the pinion is manually shifted into and out of engagement with the gear 112. In order to lock the handle 128 in its several positions it is equipped at its outer end with a spring pressed detent 129 (Fig. 5) adapted to engage in notches 131 and 132 in the transmission casing. When the arm 128 is shifted so that the detent engages in the notch 131 the pinion 111 will be withdrawn from the gear 112 and held in such position. Thus in either position of the pinion 111 it is not disturbed by longitudinal shifting movement of the friction disk shaft. The shaft section 133 which carries the fixed power pulley 134 is suitably secured at its inner end to a coupling member 135 detachably fitting on the end of the friction disk 79 and secured thereto by means of a plurality of bolts spaced circumferentially about the coupling member. A stable but adjustable bearing supports the extended end of the shaft 133 and consists of a suitable anti-friction bearing carried by a casing 136 which is adjustably supported within the annular head 137 of a bracket 138 through the agency of set screws 139 quarteringly arranged. The bracket 138 is rigidly secured to the outer frame beam 27. Inasmuch as the periphery of the bearing casing 136 is curved in a plane parallel with the longitudinal axis of the shaft 133 (as shown in our co-pending application Serial No. 302,696) and is adjustable radially in all directions by means of set screws 139 the bearing may be properly adjusted to align the shaft section 133 with the friction disk shaft.

From the foregoing, it will be noted that all of the gearing is inclosed within the transmission casing 73 and that the friction disks 78 and 79 are carried by the ends of a shaft which extends through this casing. The lubricant in the casing has a tendency to work out on the ends of the friction disk shaft and onto the faces of the friction disks. The deposit of oil on these faces very seriously affects the efficiency of a drive of this character and we have aimed to provide means for effectually preventing the oil from getting onto the disk faces. To this end a collar 141, Fig. 3, on each end of the friction disk shaft just inside of the friction disk and fixed to the transmission casing, is provided on its inner side with an annular groove 142 adapted for draining the oil which works outwardly through the bearing 76 to the passage 143, Fig. 5, and back to the casing compartment 74. The collar 141 is further shaped to provide an annular tapered flange 144 which projects into an annular chamber 145 in the face of the friction disk. This annular chamber is radially enlarged and there is a plurality of oil discharge openings 146 communicating with the periphery of said channel. The oil which drips from the flange 144 into the chamber 145 will be thrown out by centrifugal force and discharged through the openings 146 so as not to interfere with the friction disk faces.

We claim:

1. In a tractor, the combination of a main frame, a pair of traction wheels, a frame section connecting each traction wheel with the main frame and adjustable laterally thereon, a jack shaft mounted upon and adjustable laterally with each frame section for driving its respective traction wheel, a motor and transmission mechanism mounted on the main frame, the transmission mechanism including a differential, each driven member of which has a chain driving connection with one of the jack shafts, and a brake for retarding rotation of each driven member of the differential.

2. In a tractor, the combination of a main frame comprising a pair of longitudinal sills rigidly joined together by a transverse frame portion, a frame section adjustable outwardly and inwardly on each extremity of said transverse frame portion and equipped with a traction wheel and a jack shaft for driving the traction wheel, and a motor and a transmission mechanism mounted on the frame sills, the transmission mechanism including a differential each driven member of which has a separate driving connection with one of the jack shafts.

3. In a tractor, the combination of a pair of central laterally spaced power-plant sills, a cross sill structure rigidly connected to the central sills an outer brace sill rigidly connecting each outer end of the transverse sill structure with the motor end of the central sills, a frame section adjustable inwardly and outwardly on each outer extremity of the transverse sill structure, a traction wheel and a jack-shaft therefor so associated with each frame section as to be adjustable therewith as a unit, a motor mounted on the central sills, a transmission mechanism mounted on the central sills between the motor and jack-shafts, including a differential, and a driving connection between each driven member of the differential and the adjacent jack-shaft.

4. In a tractor, the combination of a main frame including a pair of central laterally spaced power-plant sills rigidly joined together at one end by a transverse sill structure, a traction wheel for each side of the frame, a jack-shaft for each traction wheel in driving connection therewith, a frame section holding each traction wheel and its jack-shaft in co-operative relation and so mounted on the lateral extremity of the transverse sill structure as to be adjustable thereon laterally of the frame, a motor and transmission mechanism mounted on the power-plant sills and including a differential, and a driving connection between each driven member of the differential and the adjacent jack-shaft.

5. In a tractor, the combination of a frame, a motor and a transmission mounted thereon, the transmission including a differential, each driven member of which is equipped with a fixed brake drum and a driving member, a traction wheel for each side of the frame, a jack-shaft in permanent driving connection with each traction wheel, means so connecting each traction wheel and its jack-shaft to the frame as to permit them to be laterally adjusted as a unit on the frame, a driven member splined on each jack-shaft in alignment with the adjacent driven member of the differential, a flexible driving connection between the aligned driven members, and brake bands for said drums adapted to be independently applied for retarding rotation of either driven member of the differential.

6. In a tractor, the combination of a pair of power-plant sills in laterally spaced parallel relation, rearwardly diverging brace sills at the outer sides of the power-plant sills, cross sills rigidly joining the rear portions of the aforementioned sills, traction wheel frame units laterally adjustable in connection with the cross sills, and a motor and transmission mechanism mounted on the power-plant sills and having driving connection with the traction wheels.

7. In a tractor, the combination of a pair of power-plant sills in laterally spaced parallel relation, rearwardly diverging brace sills at the outer sides of the power-plant sills, cross sills rigidly joining the rear portions of the aforementioned sills, rearwardly converging seat bars supported at their front ends through the agency of said cross sills and carrying at their rear ends a seat, carrying wheels for the frame including traction wheels associated with the cross sills, a motor and transmission mechanism mounted on the power-plant sills, and control devices supported through the agency of said seat bars and connected with the transmission mechanism.

8. In a tractor, the combination of a frame, supporting wheels therefor including a pair of traction wheels, a frame section for each traction wheel laterally adjustable on the frame for correspondingly adjusting its respective wheel, a jack-shaft journaled on each frame section and in driving connection with its traction wheel, a motor and transmission mechanism including a differential mounted on the frame, and a driving connection between each driven member of the differential and the adjacent jack-shaft adapted for accommodating lateral adjustments of its frame sections and appurtenant parts.

9. In a tractor, the combination of a frame, traction wheels, a motor, transmission mechanism including a differential, a jack-shaft for each traction wheel laterally adjustable therewith on the frame, and a driving connection between each driven member of the differential and the adjacent jack-shaft.

LEWIS E. WATERMAN.
HARRY R. TRAPHAGEN.
HOWARD L. WATERMAN.